United States Patent
Iwamoto et al.

(10) Patent No.: US 12,176,197 B2
(45) Date of Patent: Dec. 24, 2024

(54) INFORMATION MANAGEMENT DEVICE FOR MASS SPECTROMETER

(71) Applicant: SHIMADZU CORPORATION, Kyoto (JP)

(72) Inventors: Shinichi Iwamoto, Kyoto (JP); Yusaku Hioki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 262 days.

(21) Appl. No.: 16/162,503

(22) Filed: Oct. 17, 2018

(65) Prior Publication Data
US 2019/0115198 A1 Apr. 18, 2019

(30) Foreign Application Priority Data
Oct. 18, 2017 (JP) ................. 2017-201520

(51) Int. Cl.
*H01J 49/04* (2006.01)
*G06K 7/14* (2006.01)
(Continued)

(52) U.S. Cl.
CPC ........ *H01J 49/0418* (2013.01); *G06K 7/1408* (2013.01); *H01J 49/0004* (2013.01); *H01J 49/0027* (2013.01); *H01J 49/164* (2013.01)

(58) Field of Classification Search
CPC .............. G01N 27/628; G01N 21/84; H01J 49/0418; H01J 49/0027; H01J 49/0004; H01J 49/164; G06K 7/1408
See application file for complete search history.

(56) References Cited

U.S. PATENT DOCUMENTS

2002/0110928 A1* 8/2002 Yahiro .................. G06T 7/0012
382/128
2002/0116692 A1* 8/2002 Sone .................... G06F 3/04812
702/127
(Continued)

FOREIGN PATENT DOCUMENTS

| CN | 1928549 A | 3/2007 |
|---|---|---|
| WO | 2008/136058 A1 | 11/2008 |
| WO | 2017/085876 A1 | 5/2017 |

OTHER PUBLICATIONS

Communication dated Mar. 8, 2019 from European Patent Office in counterpart EP Application No. 18200707.0.
(Continued)

*Primary Examiner* — Nathaniel J Kolb
(74) *Attorney, Agent, or Firm* — Sughrue Mion, PLLC

(57) ABSTRACT

An imager 13 takes an image of a sample-placement surface of a sample plate 5. A plate identifier 103 decodes a barcode on the image to acquire a plate ID, recognizes the well arrangement, and retrieves a template having a cell arrangement corresponding to the well arrangement from a plate information storage section 101. A sample presence identifier 104 identifies, from the image, a well on which a sample is placed. A plate correspondence information input assistant 105 creates a template image in which the background color of the cells is changed depending on the presence of the sample, and displays it on a display unit 12. An analysis operator inputs information into each cell by a direct character-input operation or a drag-and-drop operation from a previously created sample list. The inputted information is associated with the corresponding well number and stored in a registration information storage section 107.

9 Claims, 3 Drawing Sheets

(51) Int. Cl.
H01J 49/00 (2006.01)
H01J 49/16 (2006.01)

(56) References Cited

U.S. PATENT DOCUMENTS

| | | | | |
|---|---|---|---|---|
| 2004/0202577 A1* | 10/2004 | McNeil | G01N 33/5302 | 422/82.08 |
| 2004/0217278 A1* | 11/2004 | Overney | H01J 49/0418 | 250/288 |
| 2006/0281183 A1* | 12/2006 | Sun | G01N 35/0092 | 436/43 |
| 2007/0051899 A1* | 3/2007 | Truche | G03B 15/07 | 250/423 P |
| 2008/0263468 A1* | 10/2008 | Cappione | G06F 3/04817 | 702/19 |
| 2008/0305012 A1* | 12/2008 | Camenisch | G01N 35/1016 | 422/400 |
| 2014/0210981 A1* | 7/2014 | Stauffer | G01B 11/06 | 348/79 |
| 2016/0159535 A1* | 6/2016 | Diaz | B65D 51/18 | 705/28 |
| 2019/0006162 A1 | 1/2019 | Matsushita | | |

OTHER PUBLICATIONS

Communication dated Jan. 28, 2021, from the China National Intellectual Property Administration in application No. 201811216643.4.

* cited by examiner

INFORMATION MANAGEMENT DEVICE FOR MASS SPECTROMETER

TECHNICAL FIELD

The present invention relates to a device for managing various pieces of information, such as information relating to a sample to be analyzed in mass spectrometry, analysis conditions to be used in mass spectrometry, and analysis results collected through the mass spectrometry. More specifically, the present invention relates to an information management device for a mass spectrometer which is suitable for managing information relating to a mass spectrometer that employs a matrix-assisted laser desorption/ionization method, a laser desorption/ionization method or similar ionization method.

BACKGROUND ART

In a typical measurement by a matrix-assisted laser desorption/ionization time-of-flight mass spectrometer (MALDI-TOFMS), samples mixed with a matrix are placed in wells on a sample plate (that is also referred to as a target plate) and individually irradiated with a laser beam, whereby the components in the samples are ionized, and generated ions are then subjected to mass spectrometry. In recent years, other ionization methods have also been used, such as a laser desorption/ionization method, in which components in a sample are ionized without using a matrix, or a surface-assist laser desorption/ionization (SALDI) method, in which a special sample plate is used to eliminate the necessity of the use of the matrix (see Patent Literature 1 or other documents). For a such measurement, sample plates to be used have many wells arranged in rows and columns on its upper surface. Liquid in which a sample is mixed or dissolved is dropped in each of the wells. The dropped liquid is dried into a solid, thereby forming a sample on each of the wells. The position of each well on the sample plate is usually identified by an identification number based on the row number and column number of the well.

In a typical instrumental analysis, such as mass spectrometry, it is often the case that various pieces of information relating to a sample (origin of the sample, details of the pretreatment, and so on), analysis conditions, analysis results collected through the analysis, and other pieces of information are managed in association with a sample ID or similar information which identifies the sample. In contrast, in a measurement that uses a MALDI. LDI or similar ionization method, a sample can be identified by the combination of the number of the used sample plate and the number indicating the position of the well on the plate. Accordingly, the identification information of the sample plate and the identification information of the wells are important. Here, samples having the same sample ID may be placed on a plurality of wells in the same measurement. In such an occasion, the identification information of the wells is important for identifying samples. Accordingly, for a measurement using the MALDI-TOFMS, the task of associating samples with the wells on the sample plate is normally performed prior to the measurement, as will be hereinafter described.

First, a person in charge of the analysis (who is hereinafter called an "analysis operator"), using a personal computer or similar operation terminal, finds a template having a matrix format in which cells are arranged in the same numbers of rows and columns as the well arrangement on the sample plate to be used in the measurement, among many templates prepared in advance. Then, for each of the wells in which samples have been formed, the sample ID of the sample placed on the well is written in the corresponding cell in the template by handwriting the sample ID in the corresponding cell on a sheet of paper on which the found template is printed, or by manually inputting the sample ID into the found template displayed on a display screen, using a keyboard. The cells on the template have identification numbers which are the same as those allocated to the wells. Through the aforementioned operation, a plate information sheet can be obtained in which the identification numbers of the wells on the sample plate and the sample IDs are associated with each other.

However, the task of preparing such a plate information sheet is complicated and time-consuming. Input errors are liable to occur. In particular, the number of wells on a single sample plate has significantly increased in recent years in comparison with conventional sample plates, to improve the efficiency of the measurement operation. This causes operation work as mentioned above to be more complicated.

After the completion of the analysis by a MALDI-TOFMS, it is necessary to create, for each sample, a repository in which the analysis conditions, analysis results including the obtained mass spectra and other pieces of information are compiled. If the same sample is placed on a plurality of wells and is individually subjected to the analysis, the analysis result obtained in each of the different wells needs to be compiled. Such work is also considerably complicated and takes time and effort.

CITATION LIST

Patent Literature

Patent Literature 1: WO 2008/136058

SUMMARY OF INVENTION

Technical Problem

The present invention has been developed to solve the previously described problem, and its primary objective is to provide an information management device for a mass spectrometer, which allows users to conveniently and efficiently perform operations for preparing a plate information sheet in which position information of the wells on a sample plate is associated with information on a sample.

Solution to Problem

The present invention developed for solving the previously described problem is an information management device for a mass spectrometer that performs mass spectrometry on a sample placed on a well on a sample plate having a plurality of wells including the well. The information management device is equipped with an input unit and a display unit as a user interface, and includes:

a) an imager for taking an image of a sample-placement surface of the sample plate on which the sample is to be placed:

b) a plate information storage section in which plate information for various sample plates, including the arrangement of the plurality of wells of each of the sample plates, is stored:

c) a plate information retriever for retrieving the plate information corresponding to the sample plate from the plate information storage section, based on the image of the sample plate taken with the imager or information relating to the sample plate which is inputted by a user using the input unit;

d) a sample presence identifier for identifying the well on which the sample is placed, based on the image of the sample plate taken with the imager; and e) an input assistant for (i) displaying a template including a cell arrangement corresponding to the arrangement of the plurality of wells included in the plate information retrieved by the plate information retriever, on a screen of the display unit in such a manner that a sample-placed cell, which is a cell corresponding to the well identified by the sample presence identifier as having a placed sample, is distinguishable from other cells, and for (ii) inputting information into the sample-placed cell on the template in response to an operation of the input unit by the user.

The information management device for a mass spectrometer according to the present invention can be used for any type of mass spectrometer that performs mass spectrometry on a sample or samples placed on the wells formed on the sample plate. Specifically, such a mass spectrometer includes those using an ionization method that employs a laser beam, such as a MALDI method, an LDI method, a SALDI method, or a desorption/ionization on silicon (DIOS) method. In addition, a mass spectrometer using a secondary ion mass spectrometry (SIMS) method, and a mass spectrometer using an ionization method by a fast atom bombardment (FAB) method may also be used.

In the information management device for a mass spectrometer according to the present invention, the plate information including the well arrangement is previously stored in the plate information storage section for various sample plates that may be used in the mass spectrometer. When the sample plate on which a sample to be subjected to a measurement by the mass spectrometer is placed is prepared by a user, the imager takes an image of a sample-placement surface of the sample plate. The plate information retriever retrieves plate information corresponding to the sample plate from the plate information storage section, based on the image of the sample plate taken with the imager or based on the information inputted by the user using the input unit. Here, the information inputted by the user with respect to the sample plate is, for example, the numbers of rows and columns of the wells on the sample plate, or the identification number indicating the type of sample plate. The figures, letters or the like representing those pieces of information may be directly inputted by the user, or may be selected by the user among many previously-prepared options. The sample presence identifier distinguishes, on the sample plate, wells on which samples are placed from wells on which no sample is placed by image recognition processing on the image of the sample plate.

The input assistant displays, on a screen of the display unit, a template having the cell arrangement corresponding to the well arrangement included in the plate information acquired by the plate information retriever, in such a manner that the cells corresponding to the wells on which the samples are placed can be easily distinguished from the cells corresponding to the wells on which no sample is placed. If the template is a table in which a plurality of cells are arranged in a matrix form, for example, it may be preferable that the background color of each cell on the table is changed depending on whether the cell corresponds to a well on which a sample is placed or a well on which no sample is placed. Then, the input assistant inputs any information into the cells corresponding to the sample-placed wells on the displayed template in response to an operation of the input unit by the user. It is preferable to prohibit the input of the information into the cells corresponding to the wells on which no sample is placed.

When the input unit is a keyboard, for example, an appropriate character string inputted by a user using the keyboard may be directly inputted into one of the cells. Information may be inputted into one of the cells by copying and pasting an appropriate character string or by performing a drag-and-drop operation, which is simpler, from a list previously prepared by a user or a history list of the analyses carried out in the past. It is certainly preferable that the information once inputted can be appropriately deleted and corrected.

Although there is no particular restriction on the information to be inputted into the cells in the template, the information may preferably contain at least sample identification information for identifying a sample, such as a sample ID, for example. This allows position information of each of the wells on the sample plate to be associated with the sample identification information of the sample placed on the corresponding one of the wells, based on the information inputted into each of the cells in the template.

In view of the above, in a preferable mode of the information management device for a mass spectrometer according to the present invention, the information to be inputted through the input unit under assistance by the input assistant includes sample identification information for identifying the sample, and a management information storage section is further provided, which associates identification information of each of the wells on the sample plate with the sample identification information based on the information inputted under the assistance of the input assistant, and stores a result of the association or information for the association.

In one mode of the information management device for a mass spectrometer according to the present invention, the plate information retriever is configured to recognize the position of each of the wells based on the image of the sample plate, and retrieve the plate information based on a result of the recognition.

In this mode of the present invention, the plate information retriever recognizes the areas occupied by the wells, by image recognition processing on the image of the sample plate, and thus determines the well arrangement, e.g., the numbers of rows and columns of the wells. Then, the plate information storage section is searched for the plate information which matches with that well arrangement, and the located plate information is read. Thus, the plate information is retrieved. Accordingly, users are not required to perform the task of inputting the information relating to the sample plate.

In another mode of the information management device for a mass spectrometer according to the present invention, the sample plate is provided with a barcode serving as identification information including the type of the sample plate, and the plate information retriever reads the barcode based on the image of the sample plate, and retrieves the plate information based on a result of the decoding of the barcode.

According to the embodiment, the plate information retriever reads the barcode in the image of the sample plate, and refers to the plate information storage section for a plate ID and the like obtained by decoding the barcode, thereby retrieving the plate information corresponding to the sample plate. In this configuration, the individual sample plates can be identified, in addition to the type of the sample plate (well arrangement). Accordingly, it is possible to keep a record of the plate ID obtained by decoding the read barcode and refer to the record to determine whether or not a sample plate having a certain plate ID has been already used. If the sample plate is a non-reusable type of sample plate, it is not proper to reuse the sample plate. In view of this, if it is proved that the sample plate was used in the past, an appropriate measure can be taken to avoid an improper analysis, such as alerting the user to the fact.

The system configuration or device form of the information management device for a mass spectrometer according to the present invention is not specifically limited. However, in the information management device for a mass spectrometer according to the present invention, it is preferable that the input unit, the display unit, the imager, the plate information storage section, the plate information retriever, the sample presence identifier, and the input assistant be included in a tablet terminal device having an imaging function, in order to allow a user to conveniently take an image of the sample-placement surface of the sample plate, or to easily perform the inputting operation with the input unit.

Specifically, the present device may preferably be constructed on a tablet PC (personal computer) including a display unit, an input unit, an imager, and other units, in which the functions of the plate information storage section, plate information retriever, sample presence identifier, input assistant, and other sections may be implemented by executing, on the PC, a predetermined software program installed on the same PC. Needless to say, all of those functions do not need to be implemented in the tablet terminal device. For example, some of the functions may be implemented by another PC connected to the tablet PC through a communication network line.

In particular, as mentioned above, a list previously prepared by a user or a history list of the analyses performed in the past may be used, for inputting information into each of the cells in the template corresponding to the sample plate. Such lists are often stored not in an individual tablet terminal device, but in a server configured by a PC having higher performance than tablet terminal devices. In such a case, the input assistant refers to the server for a list and the like usable for inputting the information, downloads necessary data from the server to the tablet terminal device, and then displays the data on a screen of the display unit, so as to allow a user to use the data. In this case, the function of the input assistant is not entirely implemented in the tablet terminal device, but is realized by the cooperation of the tablet terminal device and the server. In this case, the information management device for a mass spectrometer according to the present invention substantially includes the tablet terminal device and the server which are connected by a communication network line.

In the information management device for a mass spectrometer according to the present invention, the management information storage section may be configured to associate analysis result information obtained by performing mass spectrometry on the sample placed on each of the wells on the sample plate and/or data processing result information obtained by performing a predetermined analytical processing on the result of the mass spectrometry, with the identification information of each of the wells, and to store a result of the association or information for the association.

The analysis result information typically includes mass spectrum data, while the data processing result information includes, for example, the result of identification of a component in a sample. With this configuration, the device does not only associates each of the wells on the sample plate with the sample placed on that well, but also associates each of the wells with the analysis result information and the data processing result information. Accordingly, the information relating to the analyzed sample, the analysis result information, and the data processing result information can be retrieved by using, as a key, the position information of the cells on the template, i.e., the position information of the wells on the sample plate.

The information management device for a mass spectrometer according to the present invention further includes a repository creator for creating a repository for storing, for each of the samples, identification information of the sample plate, the identification information of the wells, analysis conditions, as well as the analysis result information and/or data processing result information, and for constructing a database including repositories for a plurality of samples.

With this configuration, a repository in which various pieces of information are stored can be easily created for each sample without requiring users to perform complicated operations.

Advantageous Effects of Invention

With an information management device for a mass spectrometer according to the present invention, the task of preparing a plate information sheet in which position information of the wells on a sample plate are associated with information regarding a sample can be conveniently and efficiently carried out. Such a task has conventionally been significantly complicated and time-consuming.

DESCRIPTION OF EMBODIMENTS

An embodiment of the information management device for a mass spectrometer according to the present invention is hereinafter described with reference to the drawings.

Figure 1:
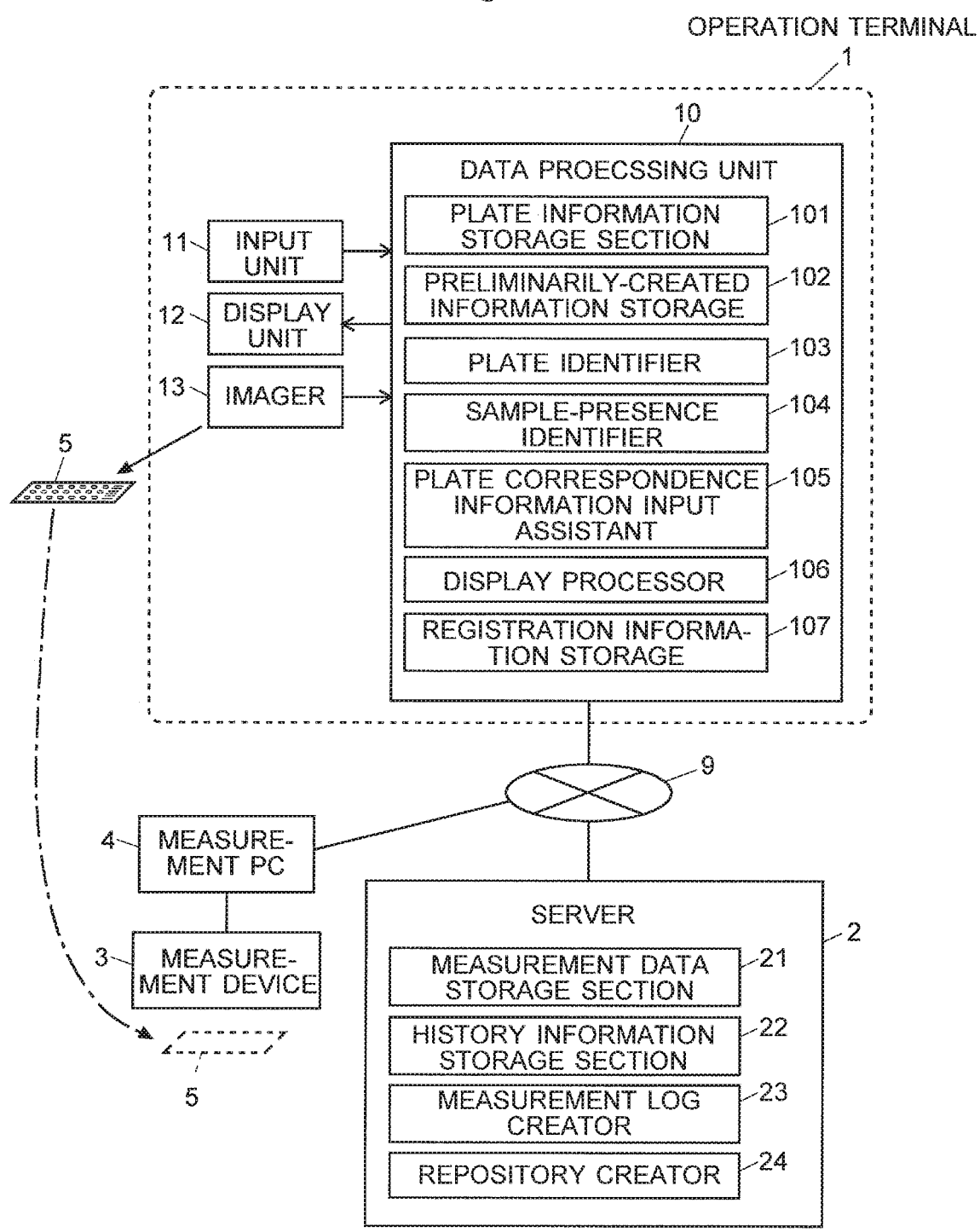
FIG. 1 is a schematic configuration diagram showing an embodiment of the information management device for a mass spectrometer according to the present invention.
Figure 2:
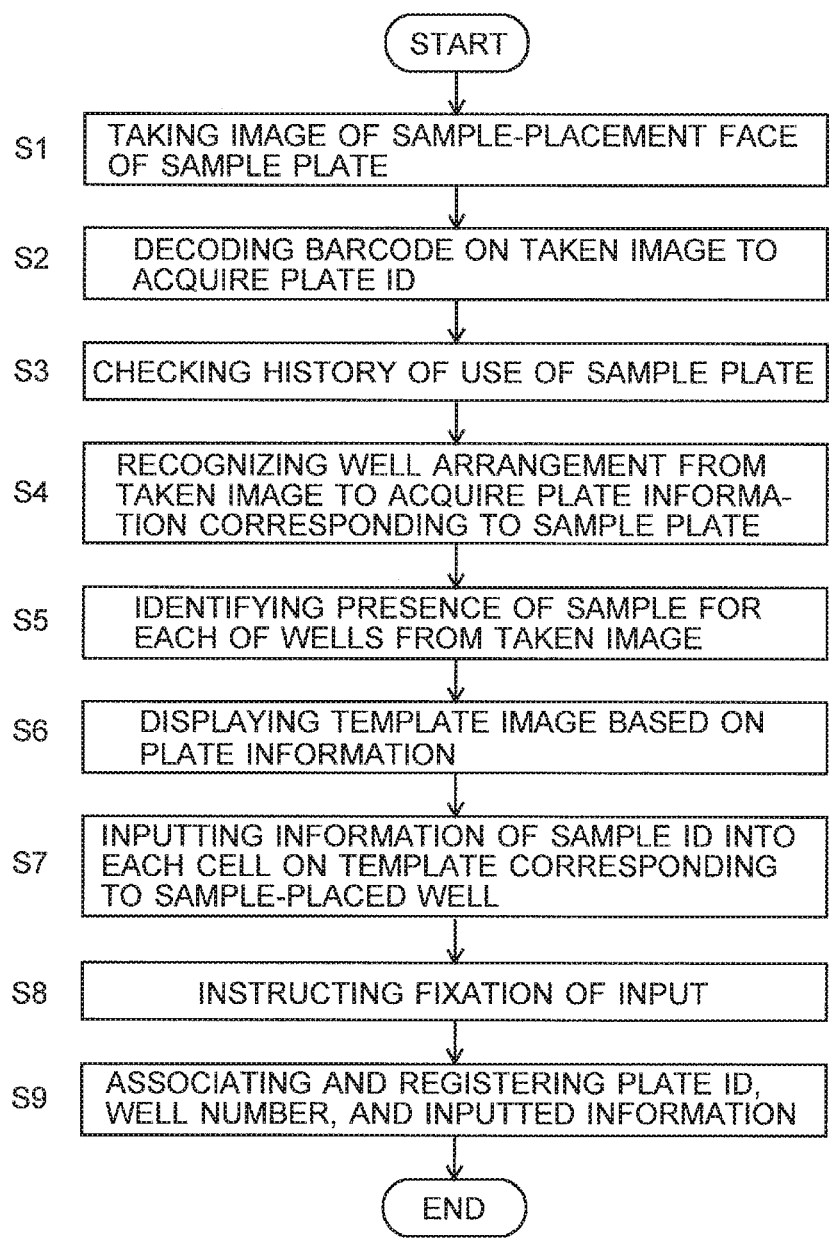
FIG. 2 is a flowchart showing steps in the operation of registering sample information in the information management device for a mass spectrometer according to the present embodiment.
Figure 3:
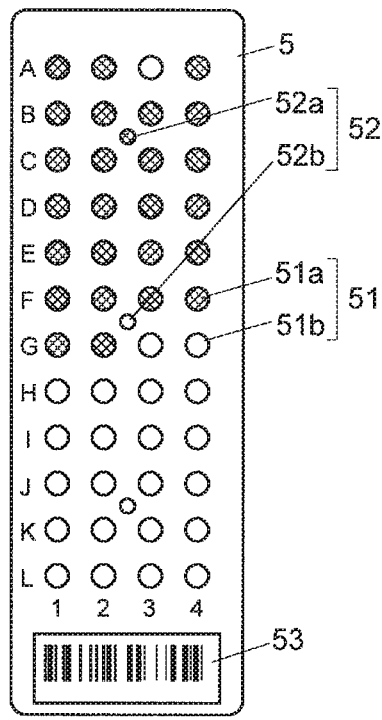
FIG. 3 is a plan view showing an example of a sample plate used in mass spectrometry.
Figure 4:
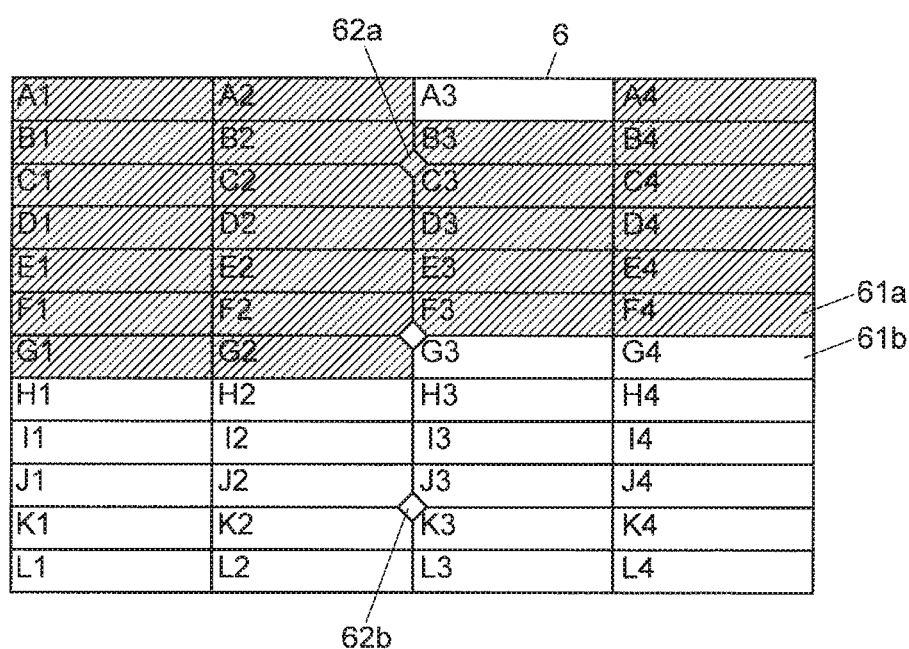
FIG. 4 is a diagram showing an example of a sample-information-input template corresponding to the sample plate shown in FIG. 3.

FIG. 1 is a diagram showing an entire configuration of an analysis system including the information management device for a mass spectrometer as one embodiment of the present invention. FIG. 2 is a flowchart showing steps in the operation of registering sample information in the information management device for a mass spectrometer according to the present embodiment. FIG. 3 is a plan view showing an example of the sample plate used in mass spectrometry. FIG. 4 is a diagram showing an example of the sample-information-input template corresponding to the sample plate shown in FIG. 3.

The analysis system shown in FIG. 1 includes an operation terminal 1, a server 2, a measurement device 3, and a measurement PC 4. The operation terminal 1, the server 2, and the measurement PC 4 are connected to a communication network line 9 that is the Internet or Intranet.

The operation terminal 1 includes a data processing unit 10, an input unit 11, a display unit 12, and an imager 13. The data processing unit 10 includes, as its functional blocks, a plate information storage section 101, a preliminarily-created information storage section 102, a plate identifier 103, a sample-presence identifier 104, a plate correspondence information input assistant 105, a display processor 106, a registration information storage section 107, and other units. For the typical operation terminal 1, a tablet PC with a touch screen may be used. A laptop PC or a smartphone may also be used. If the operation terminal 1 is a tablet PC, the function of each of the blocks included in the data processing unit 10 is realized by running, on the CPU of the PC, a dedicated software installed in the PC.

The measurement device 3 is a MALDI-TOFMS. The measurement PC 4 has functions of: controlling operation of the measurement device 3; and processing data obtained in the measurement device 3. The server 2 is mainly configured to collectively store various data, such as the data obtained by the measurement device 3 and component-identification results obtained by the data processing in the measurement PC 4. The server 2 includes a measurement data storage section 21, a history information storage section 22, a measurement log creator 23, and a repository creator 24. Although FIG. 1 shows only one measurement device 3 and only one measurement PC 4, a plurality of sets of measurement devices 3 and measurement PCs 4 may be provided. Furthermore, multiple operation terminals 1 may be provided.

As shown in FIG. 3, the sample plate 5 to be used for the measurement in the measurement device 3 is provided with wells 51 (51a and 51b) each having a circular shape viewed from above, and being arranged in the form of a 12×4 matrix (a total of 48 wells). At appropriate positions between the wells 51, calibrant-dedicated wells 52 (52a, 52b) each having a size smaller than the wells 51 are provided. The calibrant-dedicated wells 52 are dedicated to receiving a standard sample for mass calibration or the like. On the obverse surface of the sample plate 5 (sample-placement surface), a barcode 53 including a plate ID that is information for identifying the sample plate 5 is fixed.

In FIG. 3, the shaded wells 51a and 52a are wells on which samples are placed, whereas the wells 51b and 52b are wells on which no sample is placed. Specifically, in this example, the samples are placed only on 25 wells 51a among the 48 wells 51. No sample is placed on the wells 51b other than the 25 wells 51a (i.e., the wells 51b are empty). Furthermore, the standard sample is placed on one calibrant-dedicated well 52a among the three calibrant-dedicated wells 52. It is assumed here that the sample plate 5 is disposable, and thus reuse of the sample plate 5 is prohibited.

There are various types of sample plates 5 which are available for the measurement in the measurement device 3 and differ from each other in well arrangement, in addition to the one shown in FIG. 3. In view of the above, plate information including a sample-information-input template is previously stored in the plate information storage section 101 for each of the various types of sample plates which differ from one another in well arrangement. FIG. 4 shows a template 6 corresponding to the sample plate shown in FIG. 3. Each of the wells 51 on the sample plate 5 corresponds to one of the cells 61. In accordance with the 12×4 matrix arrangement of the wells 51 on the sample plate 5, the template 6 also has a tabular form in which the cells 61 are arranged in the 12×4 matrix form. The calibrant-dedicated wells 52 are represented by small diamond-shaped cells 62 surrounded by the four neighboring cells 61 in the template 6.

As mentioned above, the template stored in the plate information storage section 101 is a table in which cells are arranged in the same matrix form as the arrangement of the wells on the sample plate. As shown in FIG. 3, each of the wells on the sample plate is provided with identification information formed by combining alphabetic characters ("A" to "L" in FIG. 3) and figures ("1" to "4" in FIG. 3). Each cell on the template is also given the same identification information as the corresponding well.

An analysis operator can previously create the sample information list, and store the list in the preliminarily-created information storage section 102. The sample information list can contain a sample ID that identifies each of the samples, a pretreatment ID that identifies the type of pretreatment performed on the sample (including the type of matrix used for the MALDI), and others. Of course, it is not essential to create the sample information list in advance.

Subsequently, the description is given to the operation of inputting the sample information, which is performed mainly using the operation terminal 1, with reference to the flowchart of FIG. 2.

First, an analysis operator takes an image of the entire sample-placement surface of the sample plate 5 on which a sample is placed and which is to be subjected to a measurement by the measurement device 3, using an imager 13 of the operation terminal 1 (Step S1). If a barcode is present on the taken image, the plate identifier 103 decodes the barcode, and obtains a plate ID (Step S2).

The plate identifier 103 determines whether or not there is a history of use of the sample plate, based on the obtained plate ID (Step S3). For the determination as to whether there is a history of use of the sample plate, the information stored in the history information storage section 22 of the server 2 may be used. Alternatively, the data processing unit 10 of the operation terminal 1 may include a storage section in which the plate IDs of the used sample plates are sequentially stored. As mentioned above, the sample plate 5 is disposable. Thus, it is not proper to reuse the sample plate 5. Accordingly, if the sample plate has a history of use, it is preferable to display an alert notifying of the fact.

If the sample plate is reusable, the processing in Step S3 may be entirely omitted. However, the analysis operator may possibly mistake a sample plate which has already been used for a measurement as one which remains to be used. Therefore, it is preferable to perform the processing in Step S3 so as to show the analysis operator whether or not there is a history of use of the sample plate.

The plate identifier 103 identifies the arrangement and the number of wells on the sample plate 5 by the image processing performed on the image obtained in Step S1, and refers to the plate information storage section 101 for the identified arrangement and number. With this, the plate information including a template associated with the sample plate 5 is read (Step S4). Information indicating the type of plate may be included in the barcode 53 in addition to the information that identifies the sample plate. In such a case, the plate information including a template that is associated with the sample plate 5 can be read by referring to the plate information storage section 101 for the result of the decoding of the barcode. In this case, it is not necessary to identify the arrangement and the number of the wells on the sample plate 5 by the image processing.

The sample presence identifier 104 performs image recognition processing on the image obtained in the Step S1, so as to identify the wells 51a and 52a on which samples (including a standard sample) are placed, among the wells 51 and calibrant-dedicated wells 52 on the sample plate 5 (Step S5).

Then, the plate correspondence information input assistant 105 creates an image of the template based on the plate information obtained in Step S4. At this time, based on the result of the determination on the presence of the sample in Step S5, the background color used for cells 61a and a small cell 62a respectively corresponding to the wells 51a and the calibrant-dedicated well 52a on which the samples are placed is made to be different from that used for cells 61b and small cells 62b respectively corresponding to wells 51b and the calibrant-dedicated wells 52b on which no sample is placed. In the example shown in FIG. 4, the background of the cells 61a and the small cell 62a respectively corresponding to the wells 51a and the calibrant-dedicated well 52a on which the samples are placed is shaded, whereas the background of the cells 61b and the small cells 62b respectively corresponding to the wells 51b and the calibrant-dedicated wells 52b on which no sample is placed is colored in white. Thus, an image of the template 6 on which the presence of samples is explicitly shown on the cells 61 and 62, is displayed on the screen of the display unit 12 through the display processor 106 (Step S6). Accordingly, the analysis operator can confirm at a glance the positions of the wells 51a and the calibrant-dedicated well 52a on which the samples are placed.

As shown in FIG. 4, the identification numbers of A1, A2, . . . . B1, B2, . . . . L3, and L4 respectively corresponding to the wells 51 are displayed in the cells 61 of the template 6. While the identification numbers cannot be altered on the screen, appropriate information can be inputted into the sample-placed cells 61a on the template 6. The analysis operator inputs information including the sample ID to each of the cells 61a by any one of the methods described below (Step S7). Specific items of information that can be inputted are the sample ID that identifies the sample, an operator ID that identifies the analysis operator, and so on. The methods of inputting the information roughly include the following three methods.

(1) When an analysis operator taps, with his/her finger, a cell 61a into which the information should be inputted on the template 6 displayed in the display unit 12, the plate correspondence information input assistant 105 detects the tap operation, and displays a predetermined keyboard screen on the screen of the display unit 12 in a superposed manner. When the analysis operator appropriately inputs characters on the keyboard screen serving as the input unit 11, and performs an input-fixing operation, the inputted characters are inputted in the cell 61a designated by the tap operation. In this case, any character string can be inputted. Tapping a cell 61b corresponding to the well 51b on which no sample is placed does not open the keyboard screen. Thus, no information can be inputted into this cell 61b.

(2) When an analysis operator performs a predetermined operation on the screen of the display unit 12, the plate correspondence information input assistant 105 reads a list previously prepared by an analysis operator, and displays the list on the display screen in the superposed manner (for example, another window may be used). The analysis operator touches an appropriate piece of information on this list with his/her finger to designate the information, and performs an operation of moving the information to a cell 61a of the template 6 (drag-and-drop operation), the plate correspondence information input assistant 105 copies the information selected on the list, and inputs the information into the cell 61a. In this case, the dropping operation does not work on a cell 61b corresponding to the well 51b on which no sample is placed. Thus, no information can be inputted into the cell 61b.

(3) In the history information storage section 22 of the server 2, information such as the IDs of samples that were already subjected to measurements in the past and other information are accumulated as history information. When the same sample that was already subjected to a measurement measured needs to be once more measured, the analysis operator performs a predetermined operation on the screen, whereupon the plate correspondence information input assistant 105 accesses the server 2 and downloads necessary information from the history information storage section 22, and then displays a list based on the history information on the screen of the display unit 12. The analysis operator copies selected information by a drag-and-drop operation from the displayed list, and inputs the information into any one of the cells 61a on the template 6. It is preferable that: contents of the list can be sorted under an appropriate condition, e.g., in order of the date and time of the measurement; or contents which satisfy a specified condition (for example, those including a specific character string in their sample IDs) can be selectively displayed. With this configuration, the analysis operator can more easily or quickly find the target information, and use it. Similar to the previous case, the dropping operation does not work on the cell 61b corresponding to the well 51b on which no sample is placed. Thus, no information can be inputted into the cell 61b.

Needless to say, the information which has been inputted into the cells 61 on the template 6 by any one of the aforementioned methods can be edited and deleted as needed.

After the input of the information including the sample ID has been completed for all cells 61a corresponding to the wells 51a on which the samples are placed, the analysis operator inputs performs a predetermined operation to instruct the fixation of the input (Step S8). Upon receiving the instruction, the plate correspondence information input assistant 105 performs association on the information including the plate number of the sample plate 5, the identification numbers of the wells 51, and the sample IDs, which have been inputted for the wells 51 (51a), and stores the associated data in the registration information storage section 107 (Step S9).

Thus, the input operation of the information for the samples placed on the wells on a single sample plate is completed.

Thereafter, the measurement on each of the samples placed on the sample plate 5 is performed by the measurement device 3. At this time, a predetermined analytical processing, such as the component identification based on the mass spectrum data obtained by the measurement is performed in the measurement PC 4. Then, the measurement results, such as mass spectrum data corresponding to each of the samples on the wells, and the analytical processing results based on the measurement results are sent to the server 2 along with the measurement condition, so as to be stored in the measurement data storage section 21. In the server 2, the measurement log creator 23 creates a measurement log in which the information relating to the measurement is recorded for each of the samples. This log is created based on the measurement result, analytical processing result, measurement conditions and other data which correspond to the sample for each of the wells, as well as based on the sample IDs, well IDs and other pieces of information collected from the registration information storage section 107 of the operation terminal 1 through the communication network line 9. The repository creator 24 creates a repository in which all data obtained for each of the samples, including the measurement logs are stored, and constructs a database based on the repositories of multiple samples.

In the information management device for a mass spectrometer according to the previously described embodiment, the plate identifier 103 identifies the arrangement and the number of wells on the sample plate 5 by the image processing on the image obtained in Step S1, and refers to the plate information storage section 101 for the identified arrangement and number, or refers to the plate information storage section 101 for the result of the decoding of the barcode, thereby acquiring the plate information including the template. Accordingly, the plate information can be obtained without requiring a user to perform cumbersome tasks. Alternatively, a user may input, using the input unit 11, information relating to the sample plate necessary for reading the plate information from the plate information storage section 101, such as information of the arrangement and the numbers of rows and columns of the wells, or the identification number indicating the type of the plate.

Although such an input operation may be performed by inputting numerical values and characters, it is preferable to select them from among many options previously prepared, by a simple click operation or a touch operation. Requiring the input operation by a user in Step S4 means an increase in the manual operation by the user in comparison with a case where the plate information is automatically obtained. However, a remarkable decrease in the amount of manual operation by the user can still be achieved in comparison with conventional processing, since the user does not need to perform cumbersome operations as long as the identification of the sample-placed wells in Step S5 is concerned.

The way in which the functional blocks are assigned to the operation terminal 1 and the server 2 in the information management device for a mass spectrometer according to the above embodiment is merely an example; those functions can be appropriately shared by the operation terminal 1 and the server 2. If the operation terminal 1 has a sufficiently high processing power and a sufficiently large capacity of the data storage memory, the operation terminal 1 can be provided with all functions. However, in an analysis system which includes multiple operation terminal 1 as well as multiple sets of the measurement devices 3 and measurement PCs 4, the centralized management of the data by the server 2 is preferable. Accordingly, as in the previously described embodiment, it is more convenient to assign the functions so that only the registration operation of the information relating to the samples placed on each of the wells on a single sample plate or registration operation of other such information is performed in each of the operation terminals 1, while the creation of the measurement log and repository using the registered information is performed in a centralized fashion on the server.

The previous embodiment is an example of the present invention. It is apparent that any modification, correction, or addition within the scope of the present invention in any aspect other than those already described is included in the scope of claims of the present application.

For example, although the measurement device is a MALDI-TOFMS in the above embodiment, the measurement device is not limited to the MALDI-TOFMS and can naturally be any type of mass spectrometer that performs mass spectrometry on a sample placed on the wells on a sample plate. Specifically, a mass spectrometer using an LDI method, SALDI method, DIOS method or similar ionization method which ionizes components in a sample by irradiating the sample with a laser beam, in the same manner as in the MALDI method, for example. In addition, the mass spectrometer of the present invention may be a SIMS mass spectrometer, a mass spectrometer using a FAB ionization method, or a mass spectrometer using an ionization method that ionizes components in a sample by irradiating the sample with a particle beam, such as an atomic beam or an ion beam.

REFERENCE SIGNS LIST

1 . . . Operation Terminal
10 . . . Data Processing Unit
101 . . . Place Information Storage Section
102 . . . Preliminarily-Created Information Storage Section
103 . . . Plate Identifier
104 . . . Sample Presence Identifier
105 . . . Plate Correspondence Information Input Assistant
106 . . . Display Processor
107 . . . Registration Information Storage Section
11 . . . Input Unit
12 . . . Display Unit
13 . . . Imager
2 . . . Server
21 . . . Measurement Data Storage Section
22 . . . History Information Storage Section
23 . . . Measurement Log Creator
24 . . . Repository Creator
3 . . . Measurement Device
4 . . . Measurement Pc
5 . . . Sample Plate
51, 51a, 51b . . . Well
52, 52a, 52b . . . Calibrant-Dedicated Well
53 . . . Barcode
6 . . . Template
61, 61a, 61b . . . Cell
62, 62a, 62b . . . Small Cell
9 . . . Communication Network Line

The invention claimed is:

1. An information management device for a mass spectrometer that performs mass spectrometry on samples placed on wells on a sample plate having a plurality of wells, the information management device being equipped with an input unit and a display unit as a user interface, and comprising:

an imager configured to take an image of a sample-placement surface including wells of the sample plate on which the samples have been placed;

a plate information storage section in which plate information for various sample plates used for mass spectrometry is stored, the plate information including an arrangement of the plurality of wells of each of the various sample plates;

a plate information retriever configured to retrieve the plate information corresponding to the sample plate from the plate information storage section, based on the image of the sample plate taken with the imager or information relating to the sample plate which is inputted by a user using the input unit;

a sample presence identifier configured to identify first type of wells on which the samples are placed and to identify second type of wells that do not include any sample, based on the image of the sample plate taken with the imager;

an input assistant controller configured to display a template, which comprises a table including a plurality of cells arranged in a matrix form, including a cell arrangement corresponding to the arrangement of the plurality of wells included in the plate information retrieved by the plate information retriever, on a screen of the display unit in such a manner that sample-placed cells, which are a part of the plurality of cells corresponding to the first type of wells identified by the sample presence identifier as having a placed sample, are distinguishable from empty cells which are a part of the plurality of cells corresponding to the second type of wells identified by the sample presence identifier as not including any sample;

a cell designation and sample information retriever configured to retrieve designation of one of the plurality of cells of the table and sample identification information inputted into the designated cell, by the user using the input unit;

a display controller configured to:

when the designated cell is one of the sample-placed cells of the table, send an instruction for displaying the sample identification information retrieved by the cell designation and sample information retriever to the display unit, such that the sample identification information retrieved by the cell designation and sample information retriever is displayed in the designated cell by the display unit based on the instruction, and when the designated cell is one of the empty cells of the table, send an instruction for displaying a status of prohibition of any input of information into the designated cell to the display unit, such that the status of prohibition of any input of information is displayed in the designated cell by the display unit based on the instruction; and a registration information storage section configured to:
associate identification information of each of the wells on the sample plate with the sample identification information, and
store a result of the association.

2. The information management device for a mass spectrometer according to claim 1, wherein
the plate information retriever is configured to recognize a position of each of the wells based on the image of the sample plate, and retrieve the plate information based on a result of the recognition.

3. The information management device for a mass spectrometer according to claim 1, wherein:
the sample plate is provided with a barcode serving as identification information including a type of the sample plate; and
the plate information retriever is configured to read the barcode based on the image of the sample plate, and retrieve the plate information based on a result of decoding of the barcode.

4. The information management device for a mass spectrometer according to claim 1, wherein:
the mass spectrometer is configured to employ a matrix-assisted laser desorption/ionization method.

5. The information management device for a mass spectrometer according to claim 1, wherein:
the mass spectrometer is configured to employ a laser desorption ionization method.

6. The information management device for a mass spectrometer according to claim 1, wherein:
the input unit, the display unit, the imager, the plate information storage section, the plate information retriever, the sample presence identifier, the input assistant controller, the cell designation and sample information retriever, and the display controller are included in a tablet terminal device having an imaging function.

7. The information management device for a mass spectrometer according to claim 1, wherein:
the registration information storage section is configured to associate at least one of analysis result information obtained by performing mass spectrometry on the sample placed on each of the wells on the sample plate and analytical-processing result information obtained by performing a predetermined analytical processing on a result of the mass spectrometry, with the identification information of each of the wells, and store a result of the association.

8. The information management device for a mass spectrometer according to claim 7, further comprising:
a repository creator configured to create a repository for storing, for each sample, identification information of the sample plate, the identification information of the wells, analysis conditions, as well as at least one of the analysis result information and the analytical-processing result information, and construct a database including repositories for a plurality of samples.

9. An information management device for a mass spectrometer that performs mass spectrometry on samples placed on wells on a sample plate having a plurality of wells, the information management device comprising:
an imager configured to take an image of a sample-placement surface including wells of the sample plate on which the samples have been placed;
a data processing unit storing plate information for various sample plates used for mass spectrometry, the plate information including an arrangement of the plurality of wells of each of the various sample plates;
an input unit configured to directly input information into a part of a plurality of cells on a template, which comprises a table including the plurality of cells arranged in a matrix form, including a cell arrangement corresponding to the arrangement of the plurality of wells included in the plate information; and
a display unit configured to display the template on a screen,
wherein the plate information is retrieved based on the image of the sample plate taken with the imager or information relating to the sample plate which is inputted by the user using the input unit,
wherein first type of wells on which the samples are placed and second type of wells that do not include any sample are identified by the data processing unit, based on the image of the sample plate taken with the imager,
wherein the template is displayed on the screen of the display unit in such a manner that sample-placed cells, which are a part of the plurality of cells corresponding to the first type of wells identified as having a placed sample, are distinguishable from empty cells which are a part of the plurality of cells corresponding to the second type of wells identified as not including any sample,
wherein designation of one of the plurality of cells of the table and sample identification information inputted into the designated cell each performed by the user using the input unit are retrieved,
wherein when the designated cell is one of the sample-placed cells of the table, an instruction for displaying the retrieved sample identification information is sent to the display unit, such that the retrieved sample identification information is displayed in the designated cell by the display unit based on the instruction, wherein when the designated cell is one of the empty cells of the table, an instruction for displaying a status of prohibition of any input of information into the designated cell is sent to the display unit, such that the status of prohibition of any input of information is displayed in the designated cell by the display unit based on the instruction, and wherein identification information of each of the wells on the sample plate is associated with the sample identification information.

\* \* \* \* \*